(12) United States Patent
Chen et al.

(10) Patent No.: US 8,780,766 B2
(45) Date of Patent: Jul. 15, 2014

(54) INTERLEAVING FOR RELAY PHYSICAL DOWNLINK CONTROL CHANNEL (R-PDCCH)

(75) Inventors: Wanshi Chen, San Diego, CA (US); Juan Montojo, San Diego, CA (US); Tao Luo, San Diego, CA (US); Kapil Bhattad, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 13/210,083

(22) Filed: Aug. 15, 2011

(65) Prior Publication Data

US 2012/0039220 A1    Feb. 16, 2012

Related U.S. Application Data

(60) Provisional application No. 61/374,211, filed on Aug. 16, 2010.

(51) Int. Cl.
*H04W 72/08* (2009.01)
*H04W 88/04* (2009.01)

(52) U.S. Cl.
USPC .......................................................... 370/279

(58) Field of Classification Search
CPC . H04L 5/0048; H04L 5/0007; H04W 72/042; H04W 72/0406; H04B 7/0452
USPC .......................................... 370/276, 277, 279
See application file for complete search history.

(56) References Cited

U.S. PATENT DOCUMENTS

| | | | | |
|---|---|---|---|---|
| 2010/0272040 A1* | 10/2010 | Nam et al. | ..................... | 370/329 |
| 2011/0141987 A1* | 6/2011 | Nam et al. | ..................... | 370/329 |
| 2011/0149765 A1* | 6/2011 | Gorokhov et al. | ............ | 370/252 |
| 2011/0194551 A1* | 8/2011 | Lee et al. | ...................... | 370/342 |
| 2011/0252139 A1* | 10/2011 | Bhattad et al. | ................ | 709/226 |
| 2011/0319109 A1* | 12/2011 | Kang et al. | .................... | 455/507 |
| 2012/0002596 A1* | 1/2012 | Kim et al. | ..................... | 370/315 |
| 2012/0020230 A1* | 1/2012 | Chen et al. | .................... | 370/252 |
| 2012/0057519 A1* | 3/2012 | Kim et al. | ..................... | 370/315 |
| 2012/0106374 A1* | 5/2012 | Gaal et al. | ..................... | 370/252 |

(Continued)

FOREIGN PATENT DOCUMENTS

| | | |
|---|---|---|
| JP | 2012520048 A | 8/2012 |
| JP | 2013528035 A | 7/2013 |
| WO | WO-2011161907 A1 | 12/2011 |

OTHER PUBLICATIONS

LG Electronics, "CSI-RS Transmission in Backhaul Link," R1-103735, 3GPP TSG RAN WGT Meetings #61bis, Dresden, Germany, Jun. 28, 2010-Jul. 2, 2010, pp. 1-2.

(Continued)

*Primary Examiner* — Chi Pham
*Assistant Examiner* — Robert Lopata
(74) *Attorney, Agent, or Firm* — Patterson & Sheridan, L.L.P.

(57) ABSTRACT

Certain aspects of the present disclosure provide methods and apparatus for interleaving control information for one or more nodes. For certain aspects, the control information may comprise one or more Relay Physical Downlink Control Channels (R-PDCCHs) for one or more relay nodes. The interleaving may comprise interleaving Common Reference Signal (CRS)-based R-PDCCH, wherein the resource elements (REs) for CRS and/or Channel State Information Reference Signal (CSI-RS) may be discounted in a physical resource block (PRB).

68 Claims, 10 Drawing Sheets

(56) References Cited

U.S. PATENT DOCUMENTS

2012/0120842 A1* 5/2012 Kim et al. .................. 370/252
2012/0120903 A1* 5/2012 Kim et al. .................. 370/329
2012/0257553 A1* 10/2012 Noh et al. .................. 370/280

OTHER PUBLICATIONS

Fujitsu, CSI-RS and DRS Design for LTE-A System, R1-091950, 3GPP TSG-RAN1 #57, San Francisco, CA, May 4-8, 2009, pp. 1-9.
International Search Report and Written Opinion for International Patent Application No. PCT/US2011/047961 dated Nov. 16, 2011.
LG-Nortel: "Consideration regarding the number of REGs in R-PDCCH," 3GPP, R1-103144, May 14, 2010.
Panasonic: "R-PDCCH placement," 3GPP, R1-100382, Jan. 22, 2010.
Qualcomm Incorporated: "Details of R-PDCCH interleaver," 3GPP, R1-104812, Aug. 27, 2010.
Qualcomm Incorporated: "Finalizing R-PDCCH interleaver," 3GPP, R1-106378, Nov. 19, 2010.
Zte et al: "Way Forward on REG Definition for Interleaved R-PDCCH," 3GPP, R1-105809, Oct. 15, 2010.
CATT: "Design of reference signals for relay backhaul link in LTE-A", R1-094152, 3rd Generation Partnership Project (3GPP), Mobile Competence Centre; 650, Route Des Lucioles; F-06921 Sophia-Antipolis Cedex; France, no. Miyazaki, Oct. 12, 2009, XP050388622, [retrieved on Oct. 6, 2009].

* cited by examiner

Interaction between R-PDCCH and (R)-PDSCH

| R-PDCCH | (R)-PDSCH | Support multiplexing R-PDCCH and (R)-PDSCH in a PRB pair? |
|---|---|---|
| Configured RS type | Configured RS Type for the mode-dependent DCI | |
| CRS | CRS | No |
| CRS | DM-RS | No |
| DM-RS | DM-RS | Yes |

FIG. 5

INTERLEAVING FOR RELAY PHYSICAL DOWNLINK CONTROL CHANNEL (R-PDCCH)

CROSS-REFERENCE TO RELATED APPLICATION(S)

This application claims benefit of U.S. Provisional Patent Application Ser. No. 61/374,211, entitled "R-PDCCH Interleaver" and filed Aug. 16, 2010, which is herein incorporated by reference.

BACKGROUND

1. Field

Certain aspects of the disclosure generally relate to wireless communications and, more particularly, to interleaving for the Relay Physical Downlink Control Channel (R-PDCCH).

2. Background

Wireless communication systems are widely deployed to provide various types of communication services such as voice, video, packet data, messaging, broadcast, etc. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, single-carrier FDMA (SC-FDMA) networks, 3$^{rd}$ Generation Partnership Project (3GPP) Long Term Evolution (LTE) networks, and Long Term Evolution Advanced (LTE-A) networks.

A wireless communication network may include a number of base stations that can support communication with a number of user equipment devices (UEs). A UE may communicate with a base station via the downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE. This communication link may be established via a single-input single-output, multiple-input single-output or a multiple-input multiple-output (MIMO) system.

Wireless communication systems may comprise a donor base station that communicates with wireless terminals via a relay node, such as a relay base station. The relay node may communicate with the donor base station via a backhaul link and with the terminals via an access link. In other words, the relay node may receive downlink messages from the donor base station over the backhaul link and relay these messages to the terminals over the access link. Similarly, the relay node may receive uplink messages from the terminals over the access link and relay these messages to the donor base station over the backhaul link. The relay node may, thus, be used to supplement a coverage area and help fill "coverage holes."

SUMMARY

Certain aspects of the present disclosure generally relate to methods and apparatus for interleaving control information for one or more nodes. For certain aspects, the control information may comprise one or more Relay Physical Downlink Control Channels (R-PDCCHs) for one or more relay nodes.

The interleaving may comprise interleaving Common Reference Signal (CRS)-based R-PDCCH, wherein the resource elements (REs) for CRS and/or Channel State Information Reference Signal (CSI-RS) may be discounted in a physical resource block (PRB).

In an aspect of the disclosure, a method for wireless communications is provided. The method generally includes determining a number of antenna ports to be used for a channel state information reference signal (CSI-RS); allocating groups of n resource elements in a transmission resource unit for transmitting control information for one or more nodes, wherein the allocating comprises: (1) from resource elements in the transmission resource unit, disregarding resource elements designated for the CSI-RS based on a highest possible number of supported CSI-RS ports, regardless of the number of antenna ports to be used for the CSI-RS and (2) out of the resource elements remaining in the transmission resource unit after the disregarding, determining the groups of n resource elements; and transmitting the control information for the nodes according to the allocated groups of n resource elements.

In an aspect of the disclosure, an apparatus for wireless communications is provided. The apparatus generally includes a processing system and a transmitter. The processing system is typically configured to determine a number of antenna ports to be used for a CSI-RS and to allocate groups of n resource elements in a transmission resource unit for transmitting control information for one or more nodes. The processing system is typically configured to allocate the groups by disregarding, from resource elements in the transmission resource unit, resource elements designated for the CSI-RS based on a highest possible number of supported CSI-RS ports, regardless of the number of antenna ports to be used for the CSI-RS; and out of the resource elements remaining in the transmission resource unit after the disregarding, determining the groups of n resource elements. The transmitter is typically configured to transmit the control information for the nodes according to the allocated groups of n resource elements.

In an aspect of the disclosure, an apparatus for wireless communications is provided. The apparatus generally includes means for determining a number of antenna ports to be used for a CSI-RS; means for allocating groups of n resource elements in a transmission resource unit for transmitting control information for one or more nodes, wherein the means for allocating is configured to: (1) disregard, from resource elements in the transmission resource unit, resource elements designated for the CSI-RS based on a highest possible number of supported CSI-RS ports, regardless of the number of antenna ports to be used for the CSI-RS and (2) determine, out of the resource elements remaining in the transmission resource unit, the groups of n resource elements; and means for transmitting the control information for the nodes according to the allocated groups of n resource elements.

In an aspect of the disclosure, a computer-program product for wireless communications is provided. The computer-program product generally includes a computer-readable medium having code for determining a number of antenna ports to be used for a CSI-RS; for allocating groups of n resource elements in a transmission resource unit for transmitting control information for one or more nodes, wherein the allocating comprises: (1) from resource elements in the transmission resource unit, disregarding resource elements designated for the CSI-RS based on a highest possible number of supported CSI-RS ports, regardless of the number of antenna ports to be used for the CSI-RS and (2) out of the resource elements remaining in the transmission resource unit after the disregarding, determining the groups of n resource elements; and for transmitting the control information for the nodes according to the allocated groups of n resource elements.

In an aspect of the disclosure, a method for wireless communications is provided. The method generally includes receiving at least one transmission resource unit comprising groups of n resource elements allocated for control information for one or more nodes, wherein resource elements in the transmission resource unit associated with the groups of n resource elements are determined from the resource elements remaining after the resource elements designated for a CSI-RS are disregarded based on a highest possible number of supported CSI-RS ports, regardless of a number of antenna ports actually used for the CSI-RS; determining the control information for one of the nodes based on the allocated groups of n resource elements; and locating data based on the determined control information.

In an aspect of the disclosure, an apparatus for wireless communications is provided. The apparatus generally includes a receiver and a processing system. The receiver is typically configured to receive at least one transmission resource unit comprising groups of n resource elements allocated for control information for one or more nodes, wherein resource elements in the transmission resource unit associated with the groups of n resource elements are determined from the resource elements remaining after the resource elements designated for a CSI-RS are disregarded based on a highest possible number of supported CSI-RS ports, regardless of a number of antenna ports actually used for the CSI-RS. The processing system is typically configured to determine the control information for the apparatus based on the allocated groups of n resource elements—wherein the apparatus is one of the nodes—and to locate data based on the determined control information.

In an aspect of the disclosure, an apparatus for wireless communications is provided. The apparatus generally includes means for receiving at least one transmission resource unit comprising groups of n resource elements allocated for control information for one or more nodes, wherein resource elements in the transmission resource unit associated with the groups of n resource elements are determined from the resource elements remaining after the resource elements designated for a CSI-RS are disregarded based on a highest possible number of supported CSI-RS ports, regardless of a number of antenna ports actually used for the CSI-RS; means for determining the control information for the apparatus based on the allocated groups of n resource elements, wherein the apparatus is one of the nodes; and means for locating data based on the determined control information.

In an aspect of the disclosure, a computer-program product for wireless communications is provided. The computer-program product generally includes a computer-readable medium having code for receiving at least one transmission resource unit comprising groups of n resource elements allocated for control information for one or more nodes, wherein resource elements in the transmission resource unit associated with the groups of n resource elements are determined from the resource elements remaining after the resource elements designated for a CSI-RS are disregarded based on a highest possible number of supported CSI-RS ports, regardless of a number of antenna ports actually used for the CSI-RS; for determining the control information for one of the nodes based on the allocated groups of n resource elements; and for locating data based on the determined control information.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 5 illustrates an example interaction between a downlink control channel and a downlink shared channel, according to an aspect of the present disclosure.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

An Example Wireless Communication System

Figure 1:
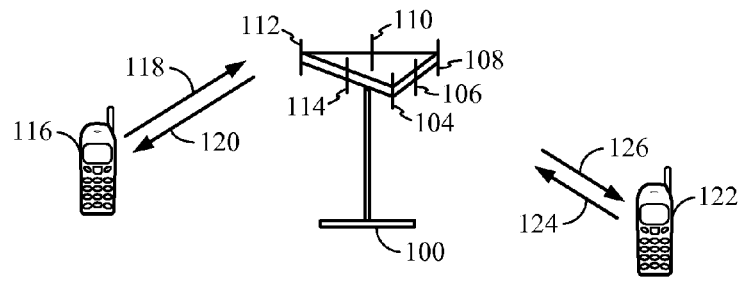
FIG. 1 illustrates an example wireless communication system according to an aspect of the present disclosure.

Referring to FIG. 1, a multiple access wireless communication system according to one embodiment is illustrated. An access point 100 (AP) includes multiple antenna groups, one including antenna 104 and antenna 106, another including antenna 108 and antenna 110, and yet another including antenna 112 and antenna 114. In FIG. 1, only two antennas are shown for each antenna group; however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect, antenna groups each are designed to communicate to access terminals in a sector, of the areas covered by access point 100.

In communication over forward links 120 and 126, the transmitting antennas of access point 100 utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point (AP) may be a fixed station used for communicating with the terminals and may also be referred to as a base station (BS), a Node B, or some other terminology. An access terminal may also be called a mobile station (MS), user equipment (UE), a wireless communication device, a terminal, a user terminal (UT), or some other terminology.

Figure 2:
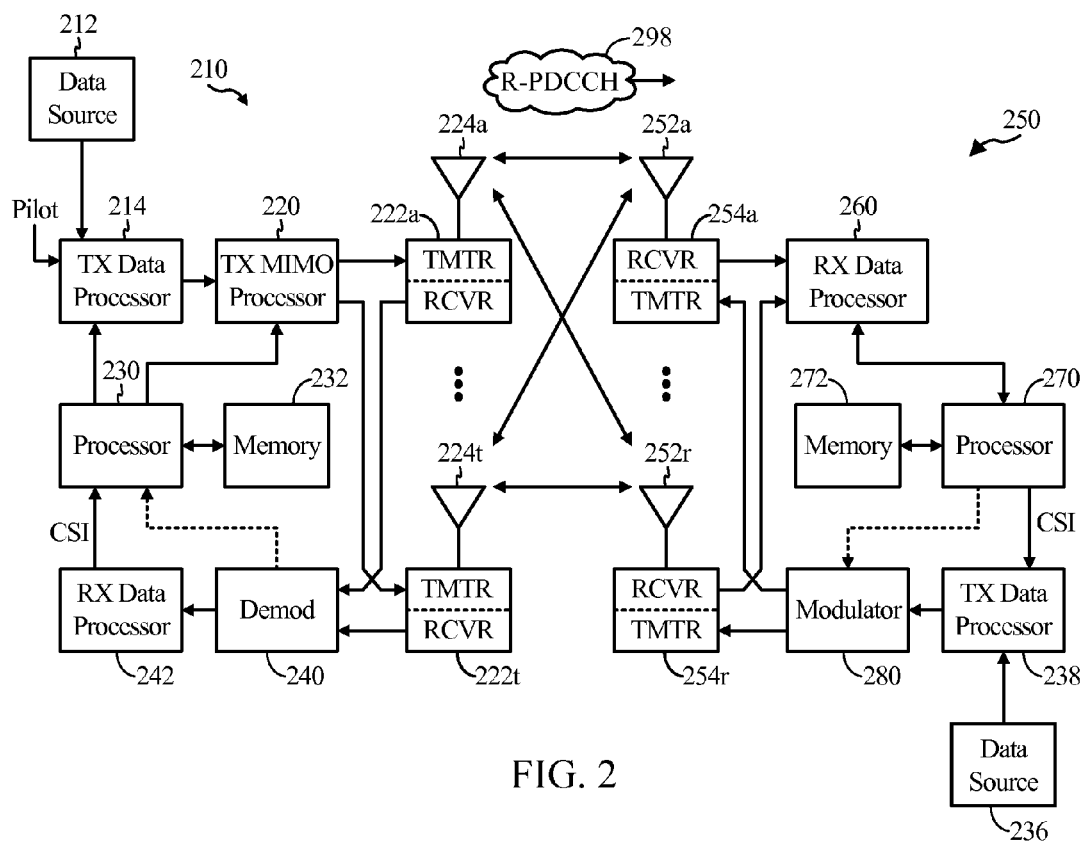
FIG. 2 is a block diagram conceptually illustrating an example of a Node B in communication with a user equipment device (UE) in a wireless communication system, according to an aspect of the present disclosure.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively. The transmitted modulated signals may indicate control information for a relay node, such as a Relay Physical Downlink Control Channel (R-PDCCH) 298, as illustrated in FIG. 2.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

In an aspect, logical channels are classified into Control Channels and Traffic Channels. Logical Control Channels comprise Broadcast Control Channel (BCCH), which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (Note: old MCCH+MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAPR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CRS Common Reference Signal
CSI-RS Channel State Information Reference Signal
CTCH Common Traffic CHannel
DCCH Dedicated Control CHannel
DCH Dedicated CHannel
DL DownLink
DL-SCH DownLink Shared CHannel
DM-RS DeModulation Reference Signal
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System UTRA UMTS Terrestrial Radio Access
UTRAN UMTS Terrestrial Radio Access Network
MBSFN Multimedia Broadcast Single Frequency Network
MCE MBMS Coordinating Entity
MCH Multicast CHannel
MSCH MBMS Scheduling CHannel
PDCCH Physical Downlink Control CHannel
PDSCH Physical Downlink Shared CHannel
PRB Physical Resource Block In addition, "Rel-8" refers to Release 8 of the LTE specification.

An Example Relay System

Figure 3:
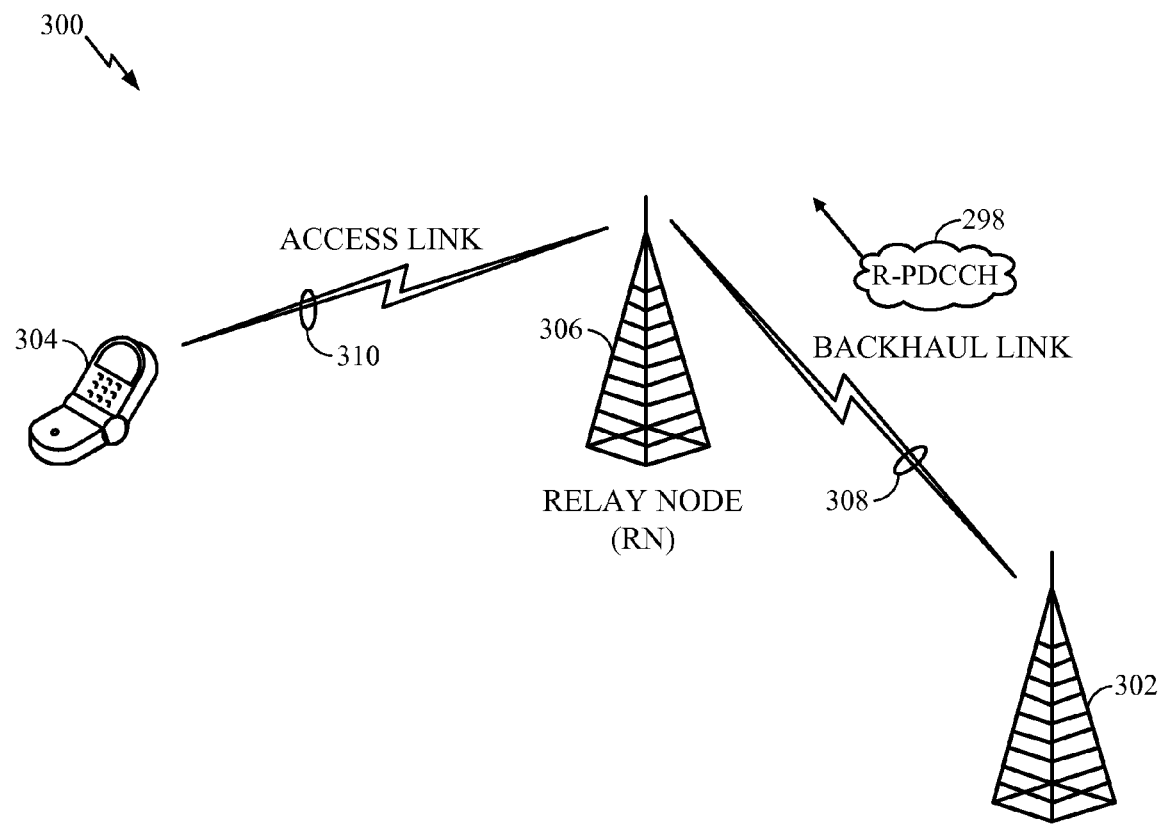
FIG. 3 illustrates an example wireless communications system with a relay node according to an aspect of the present disclosure.

FIG. 3 illustrates an example wireless system 300 in which certain aspects of the present disclosure may be practiced. As illustrated, the system 300 includes a donor base station (BS) 302 (also known as a donor access point or a donor evolved Node B (DeNB)) that communicates with a user equipment (UE) 304 via a relay node 306 (also known as a relay station or a relay).

The relay node 306 may communicate with the donor BS 302 via a backhaul link 308 and with the UE 304 via an access link 310. In other words, the relay node 306 may receive downlink messages from the donor BS 302 over the backhaul link 308 and relay these messages to the UE 304 over the access link 310. Similarly, the relay node 306 may receive uplink messages from the UE 304 over the access link 310 and relay these messages to the donor BS 302 over the backhaul link 308.

The relay node 306 may, thus, be used to supplement a coverage area and help fill "coverage holes." According to certain aspects, a relay node 306 may appear to a UE 304 as a conventional BS. According to other aspects, certain types of UEs may recognize a relay node as such, which may enable certain features.

Example R-PDCCH Interleaving

A relay node 306 may not be able to receive normal PDCCH from a donor BS 302. In this case, the donor BS may transmit a Relay Physical Downlink Control Channel (R-PDCCH) 298 via the backhaul link 308. The R-PDCCH may be transmitted in a Multimedia Broadcast Single Frequency Network (MBSFN) subframe or a non-MBSFN subframe from the donor BS. The R-PDCCH is designed to dynamically or semi-persistently assign resources for the downlink backhaul data (e.g., Physical Downlink Shared Channel (PDSCH) for a relay node (R-PDSCH) and Physical Uplink Shared Channel (PUSCH) for a relay node (R-PUSCH)).

Figure 4:
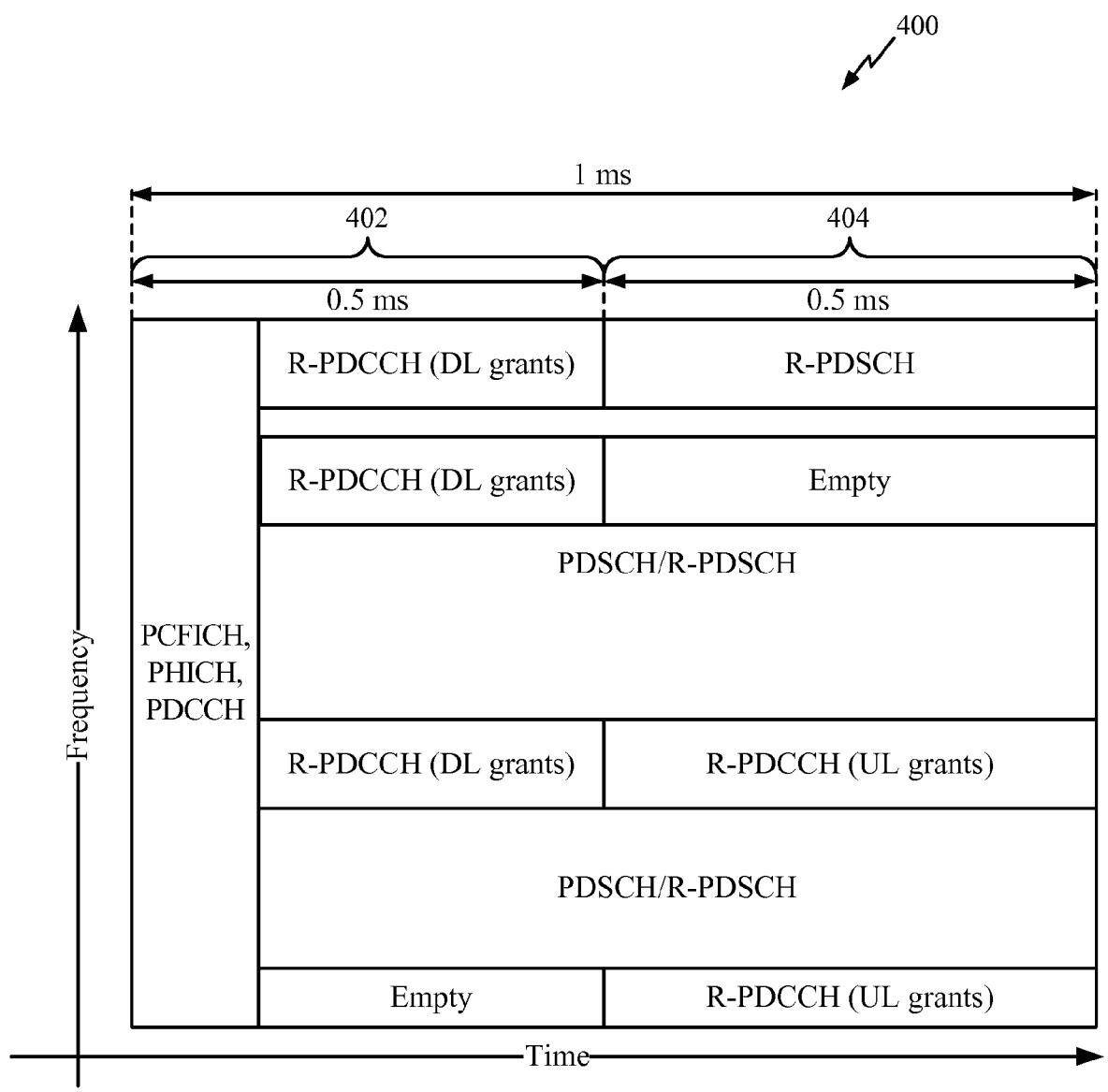
FIG. 4 illustrates an example Relay Physical Downlink Control Channel (R-PDDCH) subframe according to an aspect of the present disclosure.

FIG. 4 illustrates an example backhaul subframe 400 according to an aspect of the present disclosure. The backhaul subframe 400 is divided into a first slot 402 and a second slot 404, wherein each slot typically comprises 7 symbols in LTE for the normal cyclic prefix (CP) case. Each subframe in LTE spans 1 ms, and therefore, each slot has a duration of 0.5 ms. The first 3 symbols of the backhaul subframe 400 may be used for the Physical Control Format Indicator Channel (PCFICH), the Physical HARQ Indicator Channel (PHICH), and the normal (i.e., non-relay) PDCCH.

Various options are available for conveying information in the backhaul subframe 400. For example, DL grants are transmitted in the first slot 402. If a DL grant is transmitted in the first physical resource block (PRB) of a given PRB pair, then a UL grant may be transmitted in the second PRB of the PRB pair for certain aspects. For other aspects, data (e.g., R-PDSCH data) may be transmitted in the second slot 404 of an R-PDCCH PRB pair, or the second slot 404 may be empty.

According to certain aspects, for DM-RS-based R-PDCCH demodulation, interleaving across R-PDCCHs within a PRB is not supported. According to certain aspects, for CRS-based R-PDCCH demodulation, two interleaving modes may be supported: Rel-8-type REG-level interleaving and no interleaving across R-PDCCHs within a PRB. Certain aspects of the present disclosure provide techniques and apparatus for R-PDCCH interleaving for both DM-RS-based and CRS-based R-PDCCH demodulations.

According to certain aspects, both CRS- and DM-RS-based R-PDCCH demodulation may be supported. For DM-RS-based R-PDCCH demodulation, the DL grant and UL grant in a PRB pair may be for the same relay node (RN). Thus, there may be no REs in such a PRB pair that can be used for a different RN. On the other hand, for CRS-based R-PDCCH demodulation, two interleaving modes may be supported: Rel-8-type REG-level interleaving and no interleaving across R-PDCCHs within a PRB. Certain aspects of the present disclosure provide example interaction of reference signal (RS) types for R-PDCCH and (R)-PDSCH, and also an example interleaver design for R-PDCCH and R-PDSCH.

Fallback Operation and Interaction of RS Types for R-PDCCH and R-PDSCH

For a given RN, R-PDCCH demodulation RS type (CRS or DM-RS) may neither change dynamically nor depend on subframe type. The R-PDCCH may be demodulated with, in normal subframes, Rel-10 DM-RS when DM-RSs are configured by eNB and Rel-8 CRS otherwise. In MBSFN subframes, the R-PDCCH may be demodulated with Rel-10 DM-RS.

For downlink shared data transmission on Un, same design options as for R-PDCCH are possible. For a given RN, R-PDSCH transmission mode may neither change dynamically nor depend on subframe type. The R-PDCCH may be demodulated with CRS when CRSs are configured and with DM-RS when DM-RSs are configured according to the transmission mode. The DeNB may configure the transmission mode for an RN.

Within each (R)-PDSCH transmission mode in Rel-8, two DCI formats and correspondingly two PDSCH transmission schemes are supported: (1) DCI format 1A (for fallback operation) associated with a transmit-diversity-based PDSCH transmission scheme and (2) mode-dependent DCI format associated with a mode-dependent PDSCH transmission scheme.

One important design consideration may be whether to support the fallback operation for RNs. In Rel-8, fallback based on DCI format 1A may be desirable, especially in terms of RRC re-configuration, where there is a potential ambiguity between the eNB and the UE regarding when the new configuration is applied by the UE. Since RRC re-configurations for RNs (e.g., backhaul subframes, starting symbol index of (R)-PDSCH, RS types for R-PDCCH, DL transmission mode, etc.) may be desirable, it is natural that the fallback operation via DCI format 1A is supported for the RN backhaul, as well. For instance, without the fallback operation, RS type reconfiguration for R-PDCCH can be problematic.

However, in MBSFN subframes, CRS may not be transmitted in the data region. Rel-8 space-frequency block code (SFBC)-based transmit diversity may not be readily applied in this case. Some other transmit diversity scheme based on DM-RS may be used (e.g., large delay cyclic delay diversity (LD CDD)-like transmit diversity). As a result, it may be desirable to have at least one non-MBSFN subframe configured as part of the DL backhaul subframes.

Another design consideration may relate to time and frequency tracking at the RN. In Rel-8, such tracking relies on the availability of CRS. Due to the absence of CRS in the data region of the MBSFN subframes, Rel-8 implementation may not be readily applied. It may be possible to rely on some other means for tracking (e.g., CSI-RS, DM-RS, truncated CRS, etc.). Also, the desire for time and frequency tracking may be arguably less if the backhaul channel is assumed to be stationary. However, for simplicity and robustness, it may still be desirable to have at least one non-MBSFN subframe in the DL backhaul to enable CRS-based time and frequency tracking.

Therefore, based on the desire for fallback and timing tracking, certain aspects of the present disclosure provide the following design considerations. The same transmission modes specified for Rel-10 UEs may be supported in the RN backhaul, where DCI format 1A may be used for fallback operation. At least one non-MBSFN subframe at the donor eNB may be configured as part of the DL backhaul subframes. DCI format 1A may only be present in non-MBSFN subframes in the DL backhaul, where the same Rel-8 transmit diversity scheme may be used. In addition, certain aspects may use DCI format 1A in MBSFN subframes and use DM-RS-based transmit diversity or beamforming.

According to certain aspects, the same or different RS types for R-PDCCH and R-PDSCH may be used for an RN, such as:

CRS-based R-PDCCH and CRS-based (R)-PDSCH
CRS-based R-PDCCH and DM-RS-based (R)-PDSCH
DM-RS-based R-PDCCH, and CRS-based (R)-PDSCH
DM-RS-based R-PDCCH, and DM-RS-based (R)-PDSCH According to certain aspects, the combination of DM-RS-based R-PDCCH and CRS-based (R)-PDSCH may be of little advantage and, therefore, may not be supported.

According to certain aspects, R-PDCCH and (R)-PDSCH may be multiplexed in one PRB pair, particularly when a precoding operation is applied to both R-PDCCH and (R)-PDSCH. Therefore, the multiplexing may be supported when both R-PDCCH and R-PDSCH rely on DM-RS for demodulation. However, when R-PDCCH is CRS-based, precoding for R-PDCCH may not be possible. In addition, for REG-level R-PDCCH interleaving, one R-PDCCH may span multiple PRBs. Multiplexing CRS-based R-PDCCH and DM-RS-based (R)-PDSCH in one PRB pair may also complicate the definition of REGs, as the REs available for R-PDCCH may be discounted (i.e., reduced) by the REs for DM-RS. Therefore, multiplexing control and data in the same PRB pair in the case of CRS-based R-PDCCH and DM-RS-based PDSCH need not be supported.

The table 500 illustrated in FIG. 5 summarizes the interaction between R-PDCCH and (R)-PDSCH according to certain aspects. According to certain aspects, multiplexing for the CRS-based R-PDCCH and the CRS-based R-PDSCH in the same PRB pair may also be supported.

Interleaver for DM-RS-Based R-PDCCH

Since the entire PRB may be assumed to be designated for one R-PDCCH, it may not be necessary to have a REG definition in this case. The REs available for R-PDCCH may most likely be discounted by the REs for DM-RS (in order to support multiplexing R-PDCCH and (R)-PDSCH in the same PRB pair) and may potentially be discounted by the REs for CRS (depending on the subframe type), CSI-RS (depending on the presence of CSI-RS or not in the subframe). For CRS and CSI-RS, the RN typically knows the exact number of antenna ports and the corresponding REs. For DM-RS, the RN may further assume the maximum possible number of DM-RS REs for (R)-PDSCH (e.g., in order to avoid the potential "chicken-and-egg" problem).

In summary, for DM-RS-based R-PDCCH, the REs in a PRB for R-PDCCH may be discounted by the REs for DM-RS and may potentially be discounted by the REs for CRS and/or CSI-RS. For DM-RS, a high (e.g., maximum) possible number of DM-RS REs for (R)-PDSCH may be assumed.

According to certain aspects, R-PDCCH may also be assumed to only have rank 1 transmission. Similar to Rel-8, R-PDCCH may most likely assume QPSK modulation only.

The above design may assume that R-PDCCH is rate matching around DM-RS REs. An alternative approach may be to puncture R-PDCCH REs corresponding to those for DM-RS. With this, there is no need to assume a maximum possible number of DM-RS REs, but rather the actual number of DM-RS REs being used.

The maximum possible number of DM-RS REs discussed above may refer to the maximum from the specification perspective, where 24 REs is the maximum for Rel-10, or from the cell perspective, where the maximum is dependent on the cell configuration. As an example, if the DeNB only supports up to 2-layer transmission, only 12 REs may be implicated. From the UE or RN perspective, the maximum may be dependent on the UE category (and the cell configuration), or even further dependent on the UE transmit (TX) mode. For instance, if the UE is configured with mode 8, up to 2 rank transmissions may be done, and only 12 REs may be implicated.

Interleaver for CRS-Based R-PDCCH

For CRS-based R-PDCCH, there may be various possible interleaver operation modes, such as no interleaving across different R-PDCCHs in a PRB or Rel-8-type REG-level interleaving. The REs available for CRS-based R-PDCCH for the non-interleaving case may most likely be largely the same as those for DM-RS-based R-PDCCH. The REs available for CRC based R-PDCCH for the REG-level interleaving case can be differently designed in terms of the REs available for R-PDCCH.

According to certain aspects, if R-PDCCH is not multiplexed with (R)-PDSCH in the same PRB pair, there is no need to discount DM-RS ports in the PRBs carrying R-PDCCH.

According to certain aspects, for CRS-based R-PDCCH (especially when REG-level interleaving is configured), the REs in a PRB for R-PDCCH may potentially be discounted by the REs for CRS and/or CSI-RS.

Figure 6:
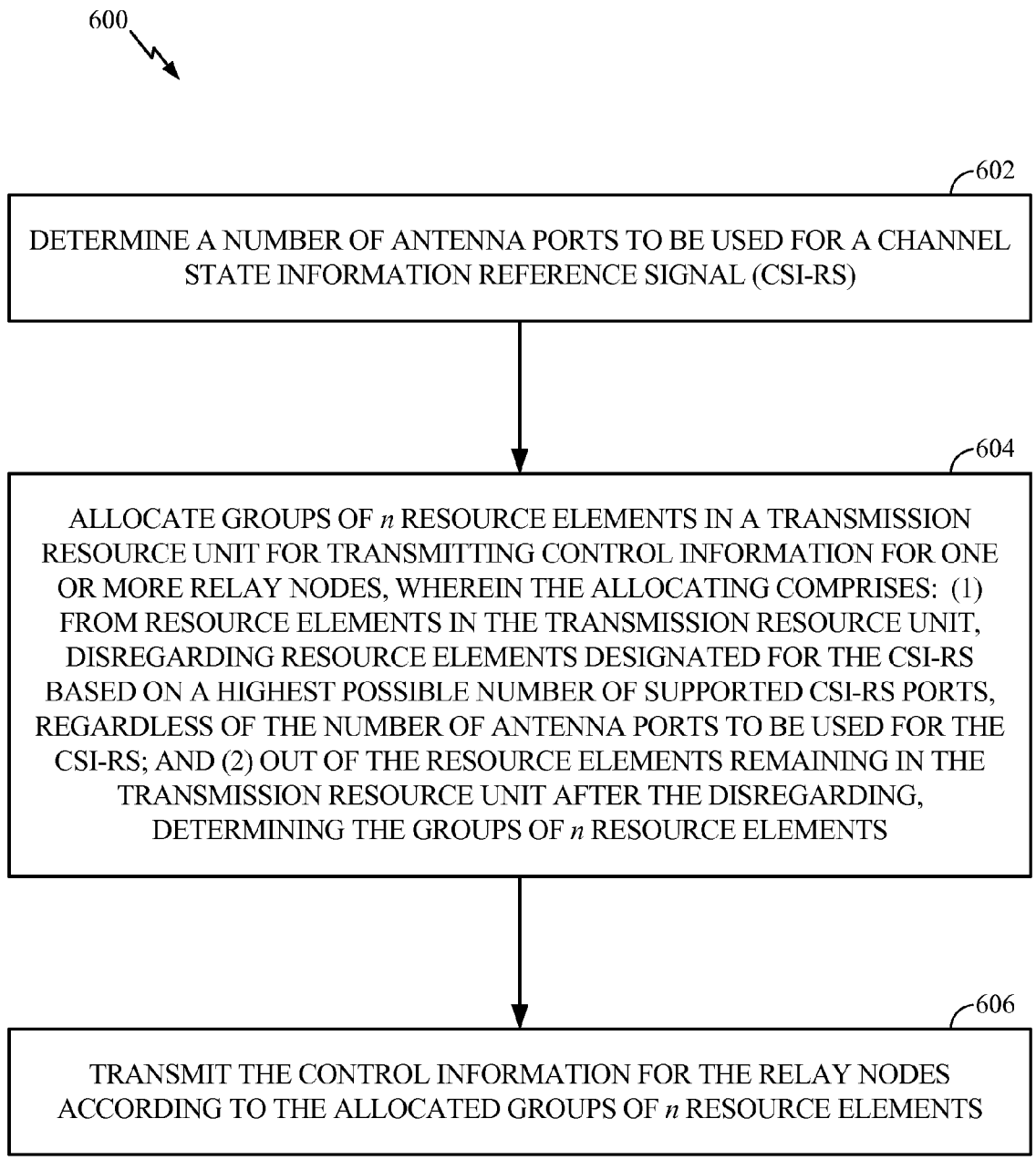
FIG. 6 is a flow diagram of example operations for transmitting control information for one or more nodes according to groups of resource elements (REs) in a transmission resource unit allocated by discounting REs designated for Channel State Information Reference Signal (CSI-RS) based on a highest possible number of supported CSI-RS ports, regardless of the number of CSI-ports to be actually used, according to an aspect of the present disclosure.

FIG. 6 is a flow diagram of example operations 600 for transmitting control information for one or more nodes according to groups of REs in a transmission resource unit allocated by discounting REs designated for CSI-RS based on a highest possible number of supported CSI-RS ports, regardless of the number of CSI-ports to be actually used. The control information for the nodes may comprise R-PDCCH, which may be CRS-based. The operations 600 may be performed by a donor eNB (DeNB), for example. The nodes may comprise relay nodes, such as half-duplex relay nodes.

The operations 600 may begin, at 602, by determining a number of antenna ports to be used for a Channel State Information Reference Signal (CSI-RS).

At 604, groups of n resource elements may be allocated in a transmission resource unit for transmitting control information for one or more relay nodes. The allocation at 604 may comprise: (1) from resource elements in the transmission resource unit, disregarding resource elements designated for the CSI-RS based on a highest possible number of supported CSI-RS ports, regardless of the number of antenna ports to be used for the CSI-RS; and (2) out of the resource elements remaining in the transmission resource unit after the disregarding, determining the groups of n resource elements. According to certain aspects, the disregarding may comprise disregarding the resource elements designated for a CRS based on at least two CRS ports. For certain aspects, determining the groups of n resource elements may involve determining, for a symbol of the transmission resource unit, a set of n contiguous resource elements out of the remaining resource elements. The allocating at 604 may comprise allocating control information for a first relay node to a first group of resource elements and allocating control information for a second relay node to a second group of resource elements.

For certain aspects, at least one of the resource elements designated for the CSI-RS may comprise a zero power CSI-RS. For other aspects, at least one of the resource elements designated for the CSI-RS may comprise a non-zero power CSI-RS.

The transmission resource unit may comprise a PRB. For certain aspects, the PRB may be in a second slot of a subframe having a first slot that precedes the second slot, and only the second slot may comprise the resource elements designated for the CSI-RS.

The number of antenna ports may comprise 1, 2, 4, or 8 antenna ports. For certain aspects, the highest possible number of supported CSI-RS ports may be 8, and n may be equal to 4.

Each of the resource elements may comprise time and frequency resources. The time and frequency resources for each of the resource elements may comprise one symbol and one subcarrier, respectively. For certain aspects, each of the groups of n resource elements comprises one symbol and n subcarriers.

At 606, the control information for the relay nodes may be transmitted according to the allocated groups of n resource elements.

Figure 6A:
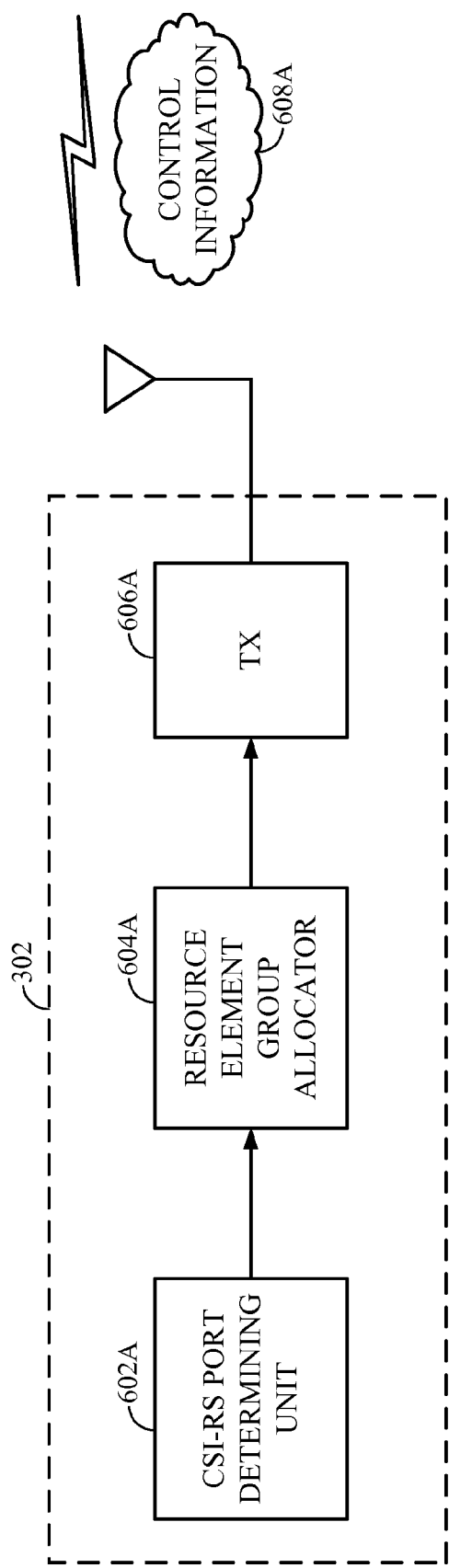
FIG. 6A illustrates example components capable of performing the operations illustrated in FIG. 6.

The operations 600 described above may be performed by any suitable components or other means capable of performing the corresponding functions of FIG. 6. For example, operations 600 illustrated in FIG. 6 correspond to components 600A illustrated in FIG. 6A. In FIG. 6A, a CSI-RS port determining unit 602A may determine a number of antenna ports to be used for a Channel State Information Reference Signal (CSI-RS). A resource element group allocator 604A may allocate groups of n resource elements in a transmission resource unit for transmitting control information for one or more relay nodes, as described above. A transmitter 606A (or a transceiver) may transmit the control information 608A for the relay nodes according to the allocated groups of n resource elements.

Figure 7:
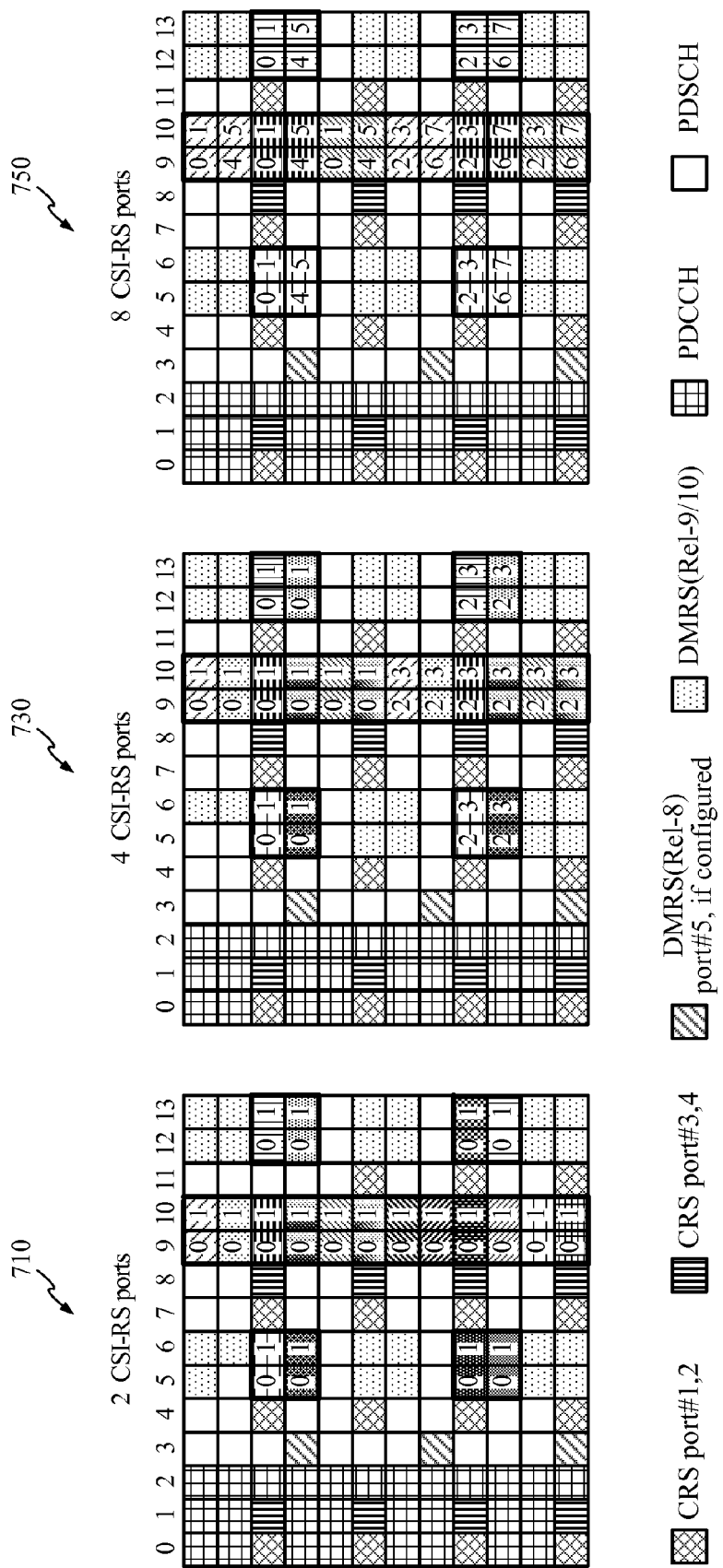
FIG. 7 illustrates example reference signal (RS) patterns for 2, 4, and 8 CSI-RS ports, according to an aspect of the present disclosure.

The REG definition may be applicable for both interleaving modes. The REG definition may preferably follow the Rel-8 REG definition as much as possible. In Rel-8, the REG definition follows a 4×1 structure, where the first index indicates the frequency tone and the second index indicates the OFDM symbol. The REGs are also numbered following the "time-first, frequency second" rule. However, in OFDM symbols containing Rel-9 or Rel-10 DM-RS and/or CSI-RS, the DM-RS or CSI-RS pattern is either constructed using 1×2 blocks or 2×2 blocks. FIG. 7 illustrates example RS patterns 710, 730, and 750 for the normal CP for 2, 4, and 8 CSI-RS ports, respectively. For the symbols containing CSI-RS in the pattern 750 for 8 CSI-RS ports, the same 4×1 rule may be easily applied within each 6 adjacent tones, but the problem becomes a bit more complicated for the patterns 730, 710 for 4 or 2 CSI-RS ports. For instance, with 4 CSI-RS ports, within each symbol, there are 10 REs left.

According to certain aspects, the following options may be applied:
   Option 1: Construct REG within 4 adjacent tones, always assuming 8 CSI-RS ports, even if fewer number CSI-RS ports are actually used.
   Option 2: Construct REG using 2×1 blocks.
   Option 3: Construct REG using 2×2 blocks.

Option 2 may be desirable given the nature of SFBC and may fully use all the REs in CSI-RS symbols for R-PDCCH. Option 3 may be aligned with the design of DM-RS and CSI-RS, but may entail a different form of transmit diversity (e.g., space-time block coding (STBC)). Option 1 may be the simplest of these options, with the potential of wasting 2 REs per CSI-RS symbol (and up to 4 REs per subframe). The same "time-first, frequency second" rule for numbering REG may be used.

According to certain aspects, power imbalance issues may occur using Option 2, with the orphan 2×1 block being used for different antennas alternately over different PRBs (e.g., even PRBs for the first pair of antennas and odd PRBs for the second pair of antennas). In order to maximize, or at least increase, the number of REGs available for (R)-PDCCH, the REGs in those OFDM symbols may be defined according to the 2×2 pattern.

As an alternative (allowing multiplexing R-PDCCH and R-PDSCH), in the case of a maximum of 24 REGs for DM-RS, within each pair of adjacent OFDM symbols containing DM-RS, there may be 3 REGs available in a PRB if the 2×2 pattern is used (versus 2 REGs using the 4×1 pattern). This alternative may involve STBC for 2×2. As another alternative (not allowing multiplexing R-PDCCH and R-PDSCH), in the case of 4 CSI-RS ports, within each pair of adjacent OFDM symbols containing CSI-RS, there may be 5 REGs available in a PRB if the 2×2 pattern is used. This is in contrast with 4 REGs in a PRB if the Rel-8 4×1 pattern is used.

The same "time-first, frequency second" rule for numbering REG may be used, the difference being that for those symbols containing 1×2 or 2×2 DM-RS/CSI-RS, the two adjacent symbols are treated as one single symbol.

Figure 8:
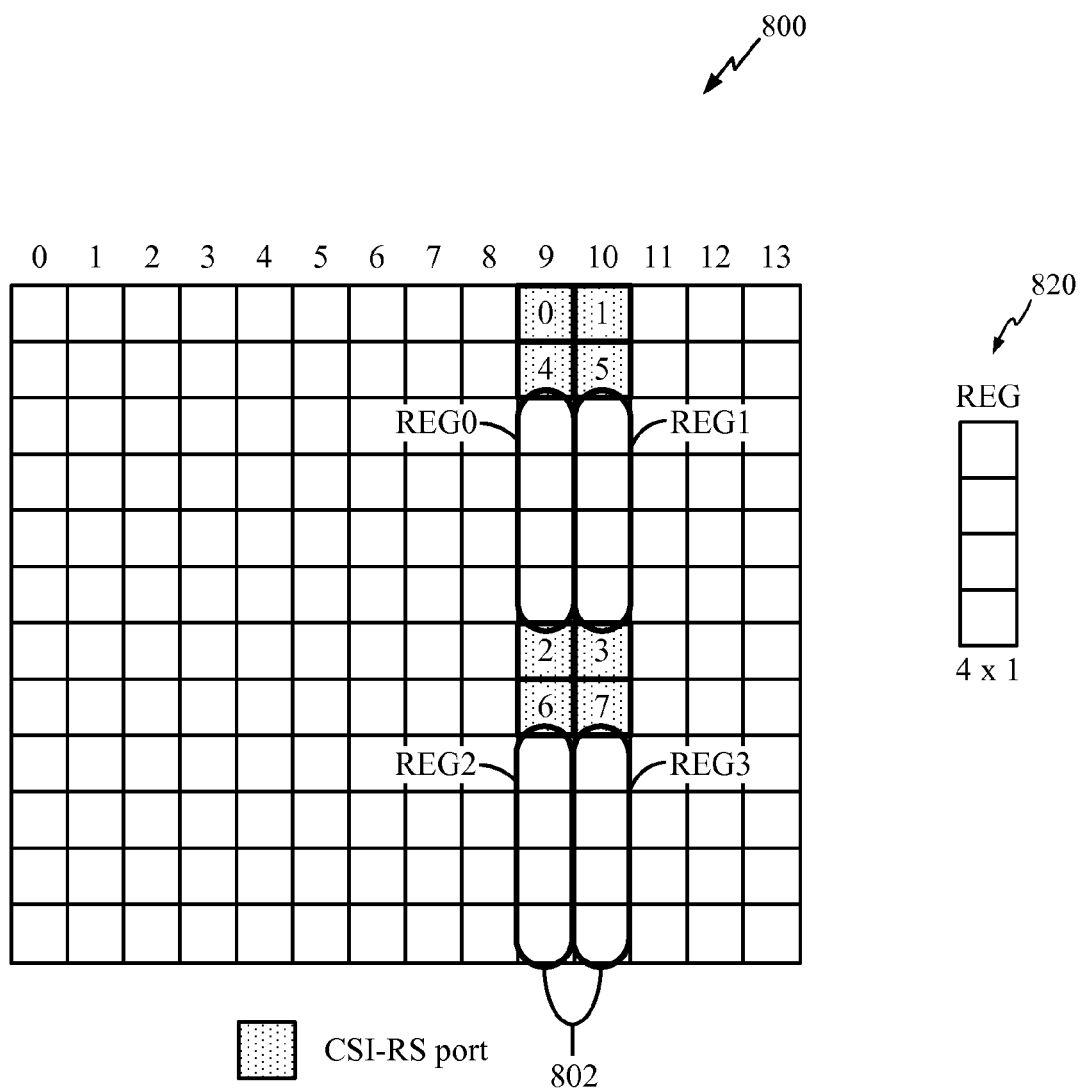
FIG. 8 illustrates resource element groups (REGs) in an example CSI-RS pattern using 8 CSI-RS ports, according to an aspect of the present disclosure.

FIG. 8 illustrates example REGs 802 (REG0 through REG3) in an example CSI-RS pattern 800 using 8 CSI-RS ports (each RE for a given CSI-RS port labeled 0 through 7). This CSI-RS pattern 800 represents one of the possible patterns from the pattern 750 in FIG. 7 for 8 CSI-RS ports, according to the various options described above. In this pattern 800, CRS and DM-RS are not shown, but may be present. The REGs 802 may follow a Rel-8 4×1 structure, as shown in the example REG 820. For symbols 9 and 10, the REGs 802 may be located in the same positions as REG0 through REG3, regardless whether 2, 4, or 8 CSI-RS ports are being used. Comparing with FIG. 7, the locations of REG0 through REG3 will not interfere with the CSI-RS for the CSI-RS patterns 710, 730 corresponding to the CSI-RS pattern 800.

In summary, for REG-level R-PDCCH interleaving, the Rel-8 REG design may be similarly used, where for the symbols containing CSI-RS, 8 CSI-RS ports (or the maximum number of possible CSI-RS ports) may always be assumed when discounting CSI-RS REs for R-PDCCH.

According to certain aspects, for both CRS- and DM-RS-based R-PDCCH, either by specification or implementation, CSI-RS may be limited to the second slot 404 (i.e., may not be permitted in the first slot 402) in an effort to alleviate the asymmetry in terms of the number of REs available for DL and UL R-PDCCH grants. According to certain aspects, DL grants may only have 4 symbols available in the first slot 402, UL grants may have the entire 7 symbols (or the first 6 symbols) available in the second slot 404, and CSI-RS may be relegated to the second slot to make the number of REs for DL and UL grants a bit more even.

Figure 9:
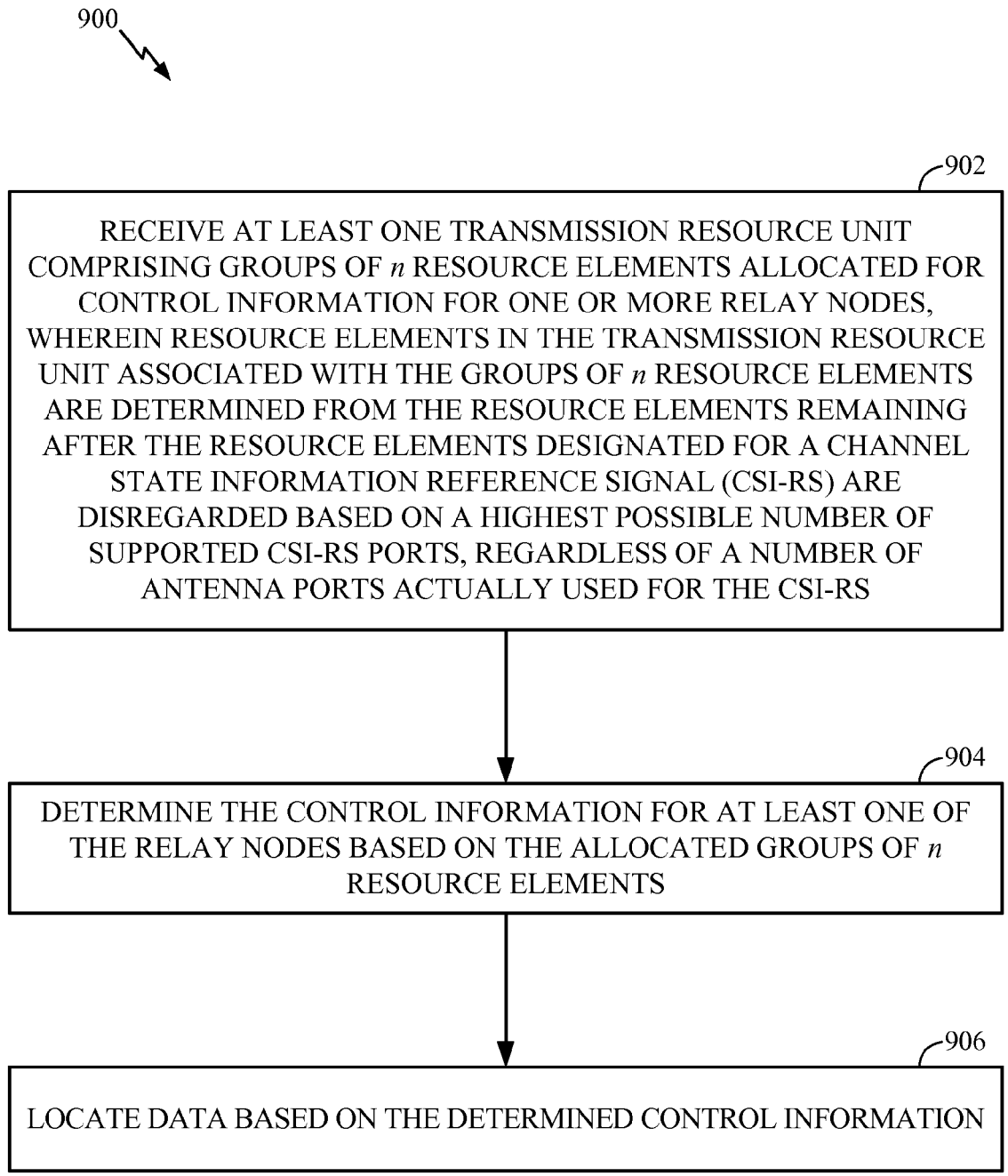
FIG. 9 is a flow diagram of example operations for determining control information for a node based on groups of REs in a transmission resource unit allocated by discounting REs designated for CSI-RS based on a highest possible number of supported CSI-RS ports, regardless of the number of CSI-ports to be actually used, according to an aspect of the present disclosure.

FIG. 9 is a flow diagram of example operations 900 for determining control information for a node based on groups of REs in a transmission resource unit allocated by discounting REs designated for CSI-RS based on a highest possible number of supported CSI-RS ports, regardless of the number of CSI-ports to be actually used. The operations 900 may be performed by the node. The node may comprise a relay node, such as a half-duplex relay node.

The operations 900 may begin, at 902, by receiving at least one transmission resource unit comprising groups of n resource elements allocated for control information for one or more relay nodes. The resource elements in the transmission resource unit associated with the groups of n resource elements may be determined from the resource elements remaining after the resource elements designated for CSI-RS are disregarded based on a highest possible number of supported CSI-RS ports, regardless of a number of antenna ports actually used for the CSI-RS. The control information for the nodes may comprise R-PDCCH, which may be CRS-based.

The transmission resource unit may comprise a PRB. For certain aspects, the PRB may be in a second slot of a subframe having a first slot that precedes the second slot, and only the second slot may comprise the resource elements designated for the CSI-RS.

According to certain aspects, the groups of n resource elements may comprise, for a symbol of the transmission resource unit, a set of n contiguous resource elements out of the remaining resource elements. For certain aspects, a first group of resource elements may comprise control information allocated for a first relay node, and a second group of resource elements may comprise control information for a second relay node.

The number of antenna ports may comprise 1, 2, 4, or 8 antenna ports. For certain aspects, the highest possible number of supported CSI-RS ports may be 8, and n may be equal to 4.

According to certain aspects, the resource elements in the transmission resource unit associated with the groups of n resource elements may be determined from the resource elements remaining after the resource elements designated for the CSI-RS and for a CRS based on at least two CRS ports are disregarded.

Each of the resource elements may comprise time and frequency resources. The time and frequency resources for each of the resource elements may comprise one symbol and one subcarrier, respectively. For certain aspects, each of the groups of n resource elements comprises one symbol and n subcarriers.

At 904, the control information for (at least) one of the nodes may be determined based on the allocated groups of n resource elements. The control information may be determined using at least one of different decoding candidates and different format sizes.

At 906, data (e.g., (R)-PDSCH data) may be located based on the determined control information. For certain aspects, downlink (DL) data may be located in the same subframe in which the control information was received or in a subsequent subframe.

Figure 9A:
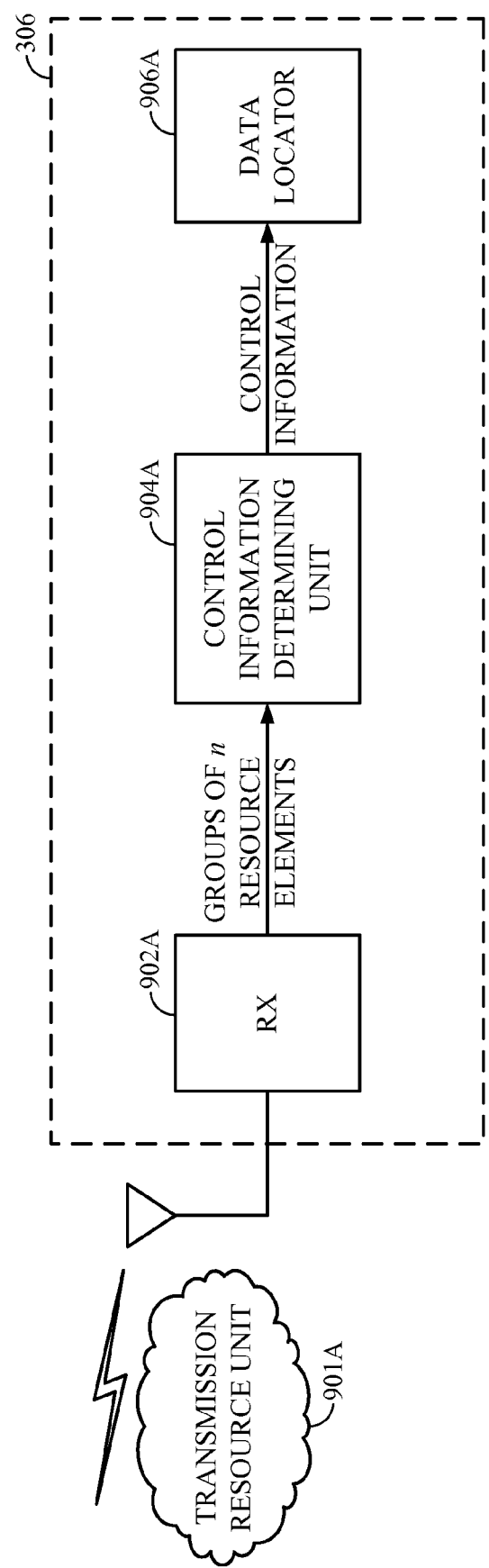
FIG. 9A illustrates example components capable of performing the operations illustrated in FIG. 9.

The operations 900 described above may be performed by any suitable components or other means capable of performing the corresponding functions of FIG. 9. For example, operations 900 illustrated in FIG. 9 correspond to components 900A illustrated in FIG. 9A. In FIG. 9A, a receiver 902A (or a transceiver) may receive at least one transmission resource unit 901A. A control information determining unit 904A may determine control information based on groups of n resource elements in the transmission resource unit. A data locator 906A may locate data based on the control information received from the control information determining unit 904A.

Interleaving Depths

According to certain aspects, a limited set of not more than 18 interleaving depths (measured in number of PRBs) may be supported (in total for UL and DL) for the REG-level interleaving. Such a limit is naturally applicable to PRB-level interleaving, as well.

The set of PRBs reserved for R-PDCCH transmission may be semi-statically configured. However, whether each RN monitors the entire set or a subset of the reserved R-PDCCH resource pool remains open. The former implies that all RNs monitor the same set of PRBs for R-PDCCH transmission. From a signaling perspective, only one cell-specific set of R-PDCCH configurations may be desired. The latter implies that the monitoring may be RN-specific and provides enhanced flexibility in R-PDCCH resource management at the expense of additional Layer 3 signaling (RN-specific R-PDCCH configuration may be desired for each RN). In Rel-10, it is reasonable to consider the former as the baseline, while the latter can be further considered in future releases.

The same R-PDCCH resource configuration may apply to both DL and UL grants. In this case, the configuration is done in units of PRB pairs.

Therefore, the interleaving depth is equivalent to the number of possible R-PDCCH configurations (in PRBs). In order to support up to 18 interleaving depths, 5 bits are indicated. One simplification is to use a 4-bit configuration. However, the configuration of the R-PDCCH resource pool not only provides the number of PRBs for R-PDCCH, but also the location of the PRBs. Both localized and distributed PRBs are possible. As a result, the total number of bits implicated for R-PDCCH resource allocation is much larger. An example of the number of PRBs for R-PDCCH can be:

{1, 2, 3, 4, 5, 6, 8, 10, 12, 16, 20, 24} where fine granularity may be specified for small number of PRBs, the increment of PRBs may be aligned with possible CCE levels (1, 2, 4 and 8), and up to 24% R-PDCCH control overhead may be aligned with Rel-8 control overhead (3 out of 14, or 21%). It may be preferable to keep at least a minimum set of R-PDCCH resources unchanged during R-PDCCH resource re-configuration in order to avoid potential ambiguity in re-configuration and potential blind detection.

DCI format 1A may always be based on CRS, while mode-dependent DCI may be configured with CRS- or DM-RS-based demodulation. It may not be desirable to support different interleaving modes for different DCIs in one cell. Therefore, according to certain aspects, there are only a limited number of possible combinations.

In accordance with the interleaver design presented herein, the same transmission modes specified for Rel-10 UEs may be supported in RN backhaul, where DCI format 1A may be used for fallback operation. At least one non-MBSFN subframe may be configured as part of the DL backhaul subframes. DCI format 1A may only present in non-MBSFN subframes in the DL backhaul, where the same Rel-8 transmit diversity scheme is used. The combination of DM-RS-based R-PDCCH and CRS-based (R)-PDSCH may not be supported. Multiplexing of CRS-based R-PDCCH with (R)-PDSCH in the same PRB pair may not be supported. QPSK may be supported for R-PDCCH. For DM-RS-based R-PDCCH, the REs in a PRB for R-PDCCH may discount the REs for DM-RS and may potentially discount those for CRS and/or CSI-RS. For DM-RS, a maximum possible number of DM-RS REs for (R)-PDSCH may be assumed.

For CRS-based R-PDCCH, the REs in a PRB for R-PDCCH may discount those for CRS and/or CSI-RS. The LTE Rel-8 REG design may be similarly used, where for the symbols containing CSI-RS, 8 CSI-RS ports (i.e., the maximum number of CSI-RS ports) may be assumed when discounting CSI-RS REs for R-PDCCH. In Rel-10, a set of semi-statically R-PDCCH resources may be cell-specific and in units of PRB pairs. R-PDCCH interleaving depth may be related to the number of PRBs configured for R-PDCCH.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in the figures, those operations may have corresponding counterpart means-plus-function components with similar numbering.

For example, means for transmitting may comprise a transmitter (e.g., a transmitter 222) and/or an antenna 224 of the transmitter system 210 or a transmitter (e.g., a transmitter 254) and/or an antenna 252 of the receiver system 250 illustrated in FIG. 2. Means for receiving may comprise a receiver (e.g., a receiver 254) and/or an antenna 252 of the receiver system 250 or a receiver (e.g., a receiver 222) and/or an antenna 224 of the transmitter system 210 illustrated in FIG. 2. Means for processing, means for determining, means for allocating, means for disregarding, or means for locating may comprise a processing system, which may include at least one processor, such as the RX data processor 260, the processor 270, and/or the TX data processor 238 of the receiver system 250 or the RX data processor 242, the processor 230, and/or the TX data processor 214 of the transmitter system 210 illustrated in FIG. 2.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
   determining a number of antenna ports to be used for a channel state information reference signal (CSI-RS);
   allocating groups of n resource elements in a transmission resource unit for transmitting control information for one or more nodes, wherein the allocating comprises:
      from resource elements in the transmission resource unit, disregarding resource elements designated for the CSI-RS based on a highest possible number of supported CSI-RS ports, regardless of the number of antenna ports to be used for the CSI-RS; and
      out of the resource elements remaining in the transmission resource unit after the disregarding, determining the groups of n resource elements; and
   transmitting the control information for the nodes according to the allocated groups of n resource elements.

2. The method of claim 1, wherein the highest possible number of supported CSI-RS ports is 8.

3. The method of claim 2, wherein n=4.

4. The method of claim 1, wherein the disregarding further comprises disregarding the resource elements designated for a common reference signal (CRS) based on at least two CRS ports.

5. The method of claim 1, wherein the control information for the nodes comprises a relay physical downlink control channel (R-PDCCH).

6. The method of claim 5, wherein the R-PDCCH comprises a common reference signal (CRS)-based R-PDCCH.

7. The method of claim 1, wherein the transmission resource unit comprises a physical resource block (PRB).

8. The method of claim 7, wherein the PRB is in a second slot of a subframe having a first slot that precedes the second slot and wherein only the second slot comprises the resource elements designated for the CSI-RS.

9. The method of claim 1, wherein each of the resource elements comprises time and frequency resources.

10. The method of claim 9, wherein the time and frequency resources for each of the resource elements comprise one symbol and one subcarrier, respectively.

11. The method of claim 10, wherein each of the groups of n resource elements spans n subcarriers of one symbol.

12. The method of claim 1, wherein determining the groups of n resource elements comprises determining, for a symbol of the transmission resource unit, a set of n contiguous resource elements out of the remaining resource elements.

13. The method of claim 1, wherein the number of antenna ports comprises 1, 2, 4, or 8 antenna ports.

14. The method of claim 1, wherein the allocating comprises:
   allocating control information for a first relay node to a first group of resource elements; and
   allocating control information for a second relay node to a second group of resource elements.

15. The method of claim 1, wherein at least one of the resource elements designated for the CSI-RS comprises a zero power CSI-RS.

16. The method of claim 1, wherein at least one of the resource elements designated for the CSI-RS comprises a non-zero power CSI-RS.

17. The method of claim 1, wherein the nodes comprise half-duplex relay nodes.

18. An apparatus for wireless communications, comprising:
   a processing system configured to:
      determine a number of antenna ports to be used for a channel state information reference signal (CSI-RS); and
      allocate groups of n resource elements in a transmission resource unit for transmitting control information for one or more nodes, wherein the processing system is configured to allocate the groups of n resource elements by:
         disregarding, from resource elements in the transmission resource unit, resource elements designated for the CSI-RS based on a highest possible number of supported CSI-RS ports, regardless of the number of antenna ports to be used for the CSI-RS; and
         out of the resource elements remaining in the transmission resource unit after the disregarding, determining the groups of n resource elements; and
      a transmitter configured to transmit the control information for the nodes according to the allocated groups of n resource elements.

19. The apparatus of claim 18, wherein the highest possible number of supported CSI-RS ports is 8.

20. The apparatus of claim 19, wherein n=4.

21. The apparatus of claim 18, wherein the disregarding further comprises disregarding the resource elements designated for a common reference signal (CRS) based on at least two CRS ports.

22. The apparatus of claim 18, wherein the control information for the nodes comprises a relay physical downlink control channel (R-PDCCH).

23. The apparatus of claim 22, wherein the R-PDCCH comprises a common reference signal (CRS)-based R-PDCCH.

24. The apparatus of claim 18, wherein the transmission resource unit comprises a physical resource block (PRB).

25. The apparatus of claim 24, wherein the PRB is in a second slot of a subframe having a first slot that precedes the second slot and wherein only the second slot comprises the resource elements designated for the CSI-RS.

26. The apparatus of claim 18, wherein each of the resource elements comprises time and frequency resources.

27. The apparatus of claim 26, wherein the time and frequency resources for each of the resource elements comprise one symbol and one subcarrier, respectively.

28. The apparatus of claim 27, wherein each of the groups of n resource elements spans n subcarriers of one symbol.

29. The apparatus of claim 18, wherein determining the groups of n resource elements comprises determining, for a symbol of the transmission resource unit, a set of n contiguous resource elements out of the remaining resource elements.

30. The apparatus of claim 18, wherein the number of antenna ports comprises 1, 2, 4, or 8 antenna ports.

31. The apparatus of claim 18, wherein the processing system is configured to allocate the groups of n resource elements by:
   allocating control information for a first relay node to a first group of resource elements; and
   allocating control information for a second relay node to a second group of resource elements.

32. The apparatus of claim 18, wherein at least one of the resource elements designated for the CSI-RS comprises a zero power CSI-RS.

33. The apparatus of claim 18, wherein at least one of the resource elements designated for the CSI-RS comprises a non-zero power CSI-RS.

34. The apparatus of claim 18, wherein the nodes comprise half-duplex relay nodes.

35. An apparatus for wireless communications, comprising:
   means for determining a number of antenna ports to be used for a channel state information reference signal (CSI-RS);
   means for allocating groups of n resource elements in a transmission resource unit for transmitting control information for one or more nodes, wherein the means for allocating is configured to:
      disregard, from resource elements in the transmission resource unit, resource elements designated for the CSI-RS based on a highest possible number of supported CSI-RS ports, regardless of the number of antenna ports to be used for the CSI-RS; and
      determine, out of the resource elements remaining in the transmission resource unit, the groups of n resource elements; and
   means for transmitting the control information for the nodes according to the allocated groups of n resource elements.

36. A computer-program product for wireless communications, comprising:
   a non-transitory computer-readable medium comprising code for:
      determining a number of antenna ports to be used for a channel state information reference signal (CSI-RS);

allocating groups of n resource elements in a transmission resource unit for transmitting control information for one or more nodes, wherein the allocating comprises:
    from resource elements in the transmission resource unit, disregarding resource elements designated for the CSI-RS based on a highest possible number of supported CSI-RS ports, regardless of the number of antenna ports to be used for the CSI-RS; and
    out of the resource elements remaining in the transmission resource unit after the disregarding, determining the groups of n resource elements; and
    transmitting the control information for the nodes according to the allocated groups of n resource elements.

37. A method for wireless communications, comprising:
receiving at least one transmission resource unit comprising groups of n resource elements allocated for control information for one or more nodes, wherein resource elements in the transmission resource unit associated with the groups of n resource elements are determined from the resource elements remaining after the resource elements designated for a channel state information reference signal (CSI-RS) are disregarded based on a highest possible number of supported CSI-RS ports, regardless of a number of antenna ports actually used for the CSI-RS;
determining the control information for one of the nodes based on the allocated groups of n resource elements; and
locating data based on the determined control information.

38. The method of claim 37, wherein the highest possible number of supported CSI-RS ports is 8.

39. The method of claim 38, wherein n=4.

40. The method of claim 37, wherein the resource elements in the transmission resource unit associated with the groups of n resource elements are determined from the resource elements remaining after the resource elements designated for the CSI-RS and for a common reference signal (CRS) based on at least two CRS ports are disregarded.

41. The method of claim 37, wherein the control information for the nodes comprises a relay physical downlink control channel (R-PDCCH).

42. The method of claim 41, wherein the R-PDCCH comprises a common reference signal (CRS)-based R-PDCCH.

43. The method of claim 37, wherein the transmission resource unit comprises a physical resource block (PRB).

44. The method of claim 43, wherein the PRB is in a second slot of a subframe having a first slot that precedes the second slot and wherein only the second slot comprises the resource elements designated for the CSI-RS.

45. The method of claim 37, wherein each of the resource elements comprises time and frequency resources.

46. The method of claim 45, wherein the time and frequency resources for each of the resource elements comprise one symbol and one subcarrier, respectively.

47. The method of claim 46, wherein each of the groups of n resource elements spans n subcarriers of one symbol.

48. The method of claim 37, wherein the groups of n resource elements comprise, for a symbol of the transmission resource unit, a set of n contiguous resource elements out of the remaining resource elements.

49. The method of claim 37, wherein the number of antenna ports comprises 1, 2, 4, or 8 antenna ports.

50. The method of claim 37, wherein determining the control information comprises determining the control information using at least one of different decoding candidates and different format sizes.

51. The method of claim 37, wherein the nodes comprise half-duplex relay nodes.

52. An apparatus for wireless communications, comprising:
a receiver configured to receive at least one transmission resource unit comprising groups of n resource elements allocated for control information for one or more nodes, wherein resource elements in the transmission resource unit associated with the groups of n resource elements are determined from the resource elements remaining after the resource elements designated for a channel state information reference signal (CSI-RS) are disregarded based on a highest possible number of supported CSI-RS ports, regardless of a number of antenna ports actually used for the CSI-RS; and
a processing system configured to:
    determine the control information for the apparatus based on the allocated groups of n resource elements, wherein the apparatus is one of the nodes; and
    locate data based on the determined control information.

53. The apparatus of claim 52, wherein the highest possible number of supported CSI-RS ports is 8.

54. The apparatus of claim 53, wherein n=4.

55. The apparatus of claim 52, wherein the resource elements in the transmission resource unit associated with the groups of n resource elements are determined from the resource elements remaining after the resource elements designated for the CSI-RS and for a common reference signal (CRS) based on at least two CRS ports are disregarded.

56. The apparatus of claim 52, wherein the control information for the nodes comprises a relay physical downlink control channel (R-PDCCH).

57. The apparatus of claim 56, wherein the R-PDCCH comprises a common reference signal (CRS)-based R-PDCCH.

58. The apparatus of claim 52, wherein the transmission resource unit comprises a physical resource block (PRB).

59. The apparatus of claim 58, wherein the PRB is in a second slot of a subframe having a first slot that precedes the second slot and wherein only the second slot comprises the resource elements designated for the CSI-RS.

60. The apparatus of claim 52, wherein each of the resource elements comprises time and frequency resources.

61. The apparatus of claim 60, wherein the time and frequency resources for each of the resource elements comprise one symbol and one subcarrier, respectively.

62. The apparatus of claim 61, wherein each of the groups of n resource elements spans n subcarriers of one symbol.

63. The apparatus of claim 52, wherein the groups of n resource elements comprise, for a symbol of the transmission resource unit, a set of n contiguous resource elements out of the remaining resource elements.

64. The apparatus of claim 52, wherein the number of antenna ports comprises 1, 2, 4, or 8 antenna ports.

65. The apparatus of claim 52, wherein the processing system is configured to determine the control information using at least one of different decoding candidates and different format sizes.

66. The apparatus of claim 52, wherein the nodes comprise half-duplex relay nodes.

67. An apparatus for wireless communications, comprising:

means for receiving at least one transmission resource unit comprising groups of n resource elements allocated for control information for one or more nodes, wherein resource elements in the transmission resource unit associated with the groups of n resource elements are determined from the resource elements remaining after the resource elements designated for a channel state information reference signal (CSI-RS) are disregarded based on a highest possible number of supported CSI-RS ports, regardless of a number of antenna ports actually used for the CSI-RS;

means for determining the control information for the apparatus based on the allocated groups of n resource elements, wherein the apparatus is one of the nodes; and means for locating data based on the determined control information.

68. A computer-program product for wireless communications, comprising:

a non-transitory computer-readable medium comprising code for:

receiving at least one transmission resource unit comprising groups of n resource elements allocated for control information for one or more nodes, wherein resource elements in the transmission resource unit associated with the groups of n resource elements are determined from the resource elements remaining after the resource elements designated for a channel state information reference signal (CSI-RS) are disregarded based on a highest possible number of supported CSI-RS ports, regardless of a number of antenna ports actually used for the CSI-RS;

determining the control information for one of the nodes based on the allocated groups of n resource elements; and locating data based on the determined control information.

* * * * *